(12) United States Patent
Fujii et al.

(10) Patent No.: US 6,691,944 B2
(45) Date of Patent: Feb. 17, 2004

(54) SEAT BELT RETRACTOR

(75) Inventors: Hiroaki Fujii, Tokyo (JP); Hiromasa Tanji, Tokyo (JP); Hideaki Yano, Tokyo (JP); Ryuji Yano, Tokyo (JP); Koji Tanaka, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/734,565

(22) Filed: Dec. 13, 2000

(65) Prior Publication Data

US 2001/0017330 A1 Aug. 30, 2001

(30) Foreign Application Priority Data

Dec. 15, 1999 (JP) ............................................. 11-355393

(51) Int. Cl.$^7$ ............................................... B65H 75/48
(52) U.S. Cl. .................. 242/390.8; 242/374; 242/390.9
(58) Field of Search ........................... 242/390.8, 390.9, 242/374; 280/806

(56) References Cited

U.S. PATENT DOCUMENTS

| | | | |
|---|---|---|---|
| 3,880,364 A | | 4/1975 | Andres |
| 4,966,394 A | | 10/1990 | Thomas et al. |
| 5,181,739 A | * | 1/1993 | Bauer et al. ................. 280/807 |
| 5,765,774 A | * | 6/1998 | Maekawa et al. ......... 242/390.9 |
| 5,788,281 A | | 8/1998 | Yanagi et al. |
| 5,816,522 A | * | 10/1998 | Krambeck et al. ........ 242/375.3 |
| 5,906,326 A | * | 5/1999 | Specht ........................ 242/374 |
| 6,042,041 A | * | 3/2000 | Foster et al. ................ 242/374 |
| 2001/0004997 A1 | * | 6/2001 | Yano et al. .............. 242/390.8 |

FOREIGN PATENT DOCUMENTS

| | | |
|---|---|---|
| DE | 2 220 669 | 4/1972 |
| DE | 2742678 | 9/1977 |
| DE | 3019298 | 5/1980 |
| DE | 69013352 | 6/1990 |
| DE | 19636448 | 9/1996 |
| DE | 19731689 | 7/1997 |

* cited by examiner

*Primary Examiner*—Donald P. Walsh
*Assistant Examiner*—Joseph C. Rodriguez
(74) *Attorney, Agent, or Firm*—Foley & Lardner

(57) ABSTRACT

A seat belt retractor having a function of taking up a seat belt using a motor. A spool is fitted in a base frame such that a torsion bar functions as a shaft of the spool. Two gear-clutch casings are disposed on the left and right sides of the spool via a pretensioner and a locking mechanism, respectively, wherein two motors are disposed to the gear-clutch casings, respectively. The two motors achieve respective functions which are different from each other and rotate at respective constant speeds.

11 Claims, 2 Drawing Sheets

PRIOR ART

SEAT BELT RETRACTOR

This application claims priority to Japanese patent application H11-355393, filed Dec. 15, 1999, the disclosure of which is hereby incorporated by reference in its entirety herein.

FIELD OF INVENTION

The present invention relates to a seat belt retractor used for a passenger car and, more particularly, to a seat belt retractor having a function of taking up a seat belt under the power of a motor.

DESCRIPTION OF THE RELATED ART

A seat belt retractor installed in an automobile has a function of removing slack of a seat belt after the seat belt is pulled around a sitting occupant and a tongue is engaged with a buckle device. To remove slack, a single return spring is conventionally used. As an occupant lets go of his/her grip on a tongue after pulling the seat belt against the biasing force of the return spring and latching the tongue to a buckle, an excess of seat belt that has been pulled out is retracted into the seat belt retractor until the seat belt is fitted more snugly to the occupant's body.

BACKGROUND OF THE INVENTION

As mentioned above, the seat belt retractor is required to satisfy the following conditions simultaneously:

(1) excess of the pulled-out seat belt is securely retracted until the seat belt is fitted to the occupant's body or the pulled-out amount of the seat belt is securely retracted into a storage area when nobody wears the seat belt; and (2) not too much stress is applied to the chest or other portions of the occupant who properly wears the seat belt.

However, the use of a single return spring in the conventional seat belt retractor has the following problems. When a spring which provides a small biasing force is employed (in order to reduce stress to be applied to the chest of the occupant), the force for taking up (retracting) the seat belt is accordingly weaker, thus lessening its operation and its secure retracting performance. On the other hand, when a spring which provides a large biasing force is employed (in order to provide enough winding force for its secure retracting performance), increased stress is applied to the chest of the occupant who properly wears the seat belt. Because a single return spring is employed, the conventional seat belt retractor also has a problem that the biasing force of the return spring increases as the seat belt is increasingly pulled out because the return spring is being repeatedly wound up.

To ameliorate the aforementioned problems, a seat belt retractor having a function of taking up the seat belt under the power of a motor has been invented by the inventors of this application and has been filed as a Japanese patent application no. H11-173624, the disclosure of which is hereby incorporated by reference. In addition, a method of providing variable-torque by a single motor has been invented and has been filed as Japanese patent application no. H11-126242. Though these can be used together with a mechanical take-up spring, controlling the retraction mode is accomplished by changing the torque and/or the rotation speed of the single motor.

An embodiment of the seat belt retractor of the Japanese patent application No. H11-173624 is schematically shown in FIG. 2. The seat belt retractor comprises a base frame 11, a spool 12 for winding up a seat belt W, and a torsion bar 13 functioning as a shaft through which the spool 12 is fitted into the base frame 11, wherein one end of the torsion bar 13 is journalled in a shaft hole of a gear-clutch casing 14 and the other end of the torsion bar 13 is journalled in a hole formed in a cover 18. Inside of the gear-clutch casing 14, reduction gears and a clutch are disposed whereby the rotation of the pinion gear 16 rotated by a motor 15 is reduced and then transmitted to the torsion bar 13.

It should be noted that a return spring may be disposed inside the gear-clutch casing 14 but not shown. When the motor 15 is not actuated, the retraction with weak force can be performed by the return spring. At a side of the base frame 11 opposite to the gear-clutch casing 14, a locking mechanism 17 is disposed to lock the rotation of the spool 12 when the seat belt is rapidly pulled out.

However, the aforementioned retractor of the prior application has the following problems. First, a voltage controller for applying voltage and a PWM controller are required to vary the torque and/or the rotation speed of one motor, thereby increasing the cost of the seat belt retractor. When the voltage controller and the PWM controller are actuated, noise may be generated from a switching circuit of the controller and unexpectedly flow to the battery side to affect other controllers. Therefore, it is required to dispose a filter to remove the noise. This is another reason for increasing the cost of the seat belt retractor.

SUMMARY OF THE INVENTION

The present invention was made under these circumstances and the object of the present invention is to reduce the cost of a seat belt retractor having a function of taking up the seat belt by power of a motor. In addition, a method for increasing safety has been created in which a large tension is applied to a seat belt to strongly restrain the occupant to a seat when a vehicle collision is predicted. The conventional seat belt retractor can not cope with such a method.

The first means to solve the aforementioned problems is a seat belt retractor having a function of taking up a seat belt under power of a motor, wherein the seat belt retractor is driven by a plurality of motors. A torque controller and a rotation speed controller are not required, thereby reducing the cost of a seat belt system as a whole. As mentioned above, in the invention of the prior application, one motor is used to achieve a plurality of functions so that the torque and the rotational speed of the motor should be controlled, thus increasing the cost of a seat belt system as a whole. According to this means, the plurality of motors are employed in the seat belt retractor so that the desired functions are allotted among these motors. Therefore, it is allowed that these motors just rotate at respective constant speeds without changing the speed so that a torque controller and a rotation speed controller are not required, thereby reducing the cost of a seat belt system as a whole, even though the number of motors and the number of mechanical parts are increased.

The second means to solve the problems is the first means, but characterized in that the plurality of motors achieve respective functions which are different from each other. Main components of the retractor can be commonly used, thereby further reducing the cost of the seat belt system as a whole. According to this means, since the plurality of motors achieve the respective functions, the motors can be selected according to the required specifications and main components of the retractor can be commonly used, thereby further reducing the cost of the seat belt system as a whole.

The third means to solve the aforementioned problems is the first means or the second means, but characterized in that at least one of the motors is attached to a frame separate from a frame to which other motors are attached. The motor and the attached mechanism can be replaced as one unit, thereby further reducing the cost of the seat belt system as a whole. In this retractor, the motor which is selectively used according to the type of the vehicle is attached to the frame separate from the frame to which the motor which is commonly used in any type of the vehicle is attached, so the motor which selectively used according to the type of the vehicle can be replaced as one unit including the mechanisms attached to the motor, thereby reducing the cost of the seat belt system as a whole.

The fourth means to solve the aforementioned problems is the third means, but characterized in that at least one motor is a motor achieving a comforting function or a motor achieving a pretensioning function. Improved flexibility to the optional requirements can be obtained, thereby reducing the cost of the seat belt system as a whole. The motor achieving the comforting function is a motor which retracts the seat belt with a tension not to make an occupant feel pressure and the motor achieving the pretensioning function is a motor which retract the seat belt with such a strong tension as to restrain the occupant to a vehicle seat at a point when the occurrence of an emergency (collision) is predicted. A mechanical return spring may be used in place of the motor achieving the comforting function. The motor achieving the pretensioning function may be optional in many cases. Therefore, these motors may be sometimes required and sometimes not required according to the type of vehicle. Accordingly, by attaching these motors to the frame separate from the frame to which other motors are attached, the flexibility to easily cope with optional requirements can be obtained, thereby reducing the cost of the seat belt system as a whole.

The fifth means to solve the aforementioned problems is the third means or the fourth means, but characterized by comprising two frames to which the motors are attached, wherein the frames are disposed to a base frame such that said frames are positioned at the both sides of a spool. The requirement on the space for installation is relaxed, thereby facilitating the use of the seat belt retractor to be common to the left-side seat and right-side seat of the vehicle. When the seat belt retractor is installed in the vehicle, the center of the installation may be the center of the seat belt. Therefore, by configuring the entire structure of the seat belt retractor to be symmetrical relative to the center of the seat belt as possible, the requirement on the space for installation can be relaxed. In addition, the symmetrical entire structure relative to the center of the seat belt enables the same refractors to be used for a left-side seat and a right-side seat of the vehicle easily. According to this means, the two frames to which the motors are attached are disposed to the base frame to be positioned on both sides of the spool so that the configuration of the entire device can be nearly symmetrical, i.e., the left side and the right side (the front side and the rear side in the state installed to the vehicle) are mirror images of each other, thereby obtaining the aforementioned advantages.

The sixth means to solve the aforementioned problems is any one of the first through fifth means, but characterized that the motors are positioned at a side opposite to the position of a projection of a pretensioner in the vertical direction of the base frame. The position of the projection of the pretensioner and the positions of the motors do not interfere with one another, thereby increasing the degrees of freedom on the installation. The pretensioner which rapidly takes up the seat belt to restrain the occupant to the seat in the event of vehicle collision has a projection positioned at one of the upper and lower sides of the pretensioner. In this means, the motors are positioned at a side opposite to the side at which the projection is positioned, relative to the base frame. That is, when the projection is positioned at the lower side relative to the base frame, the motors are positioned at the upper side relative to the base frame. When the projection is positioned at the upper side relative to the base frame, the motors are positioned at the lower side relative to the base frame. Therefore, the position of the projection of the pretensioner and the positions of the motors do not interfere with one another, thereby increasing the degrees of freedom on the installation.

DETAILED DESCRIPTION OF THE PREFERRED EMBODIMENTS

Figure 1:
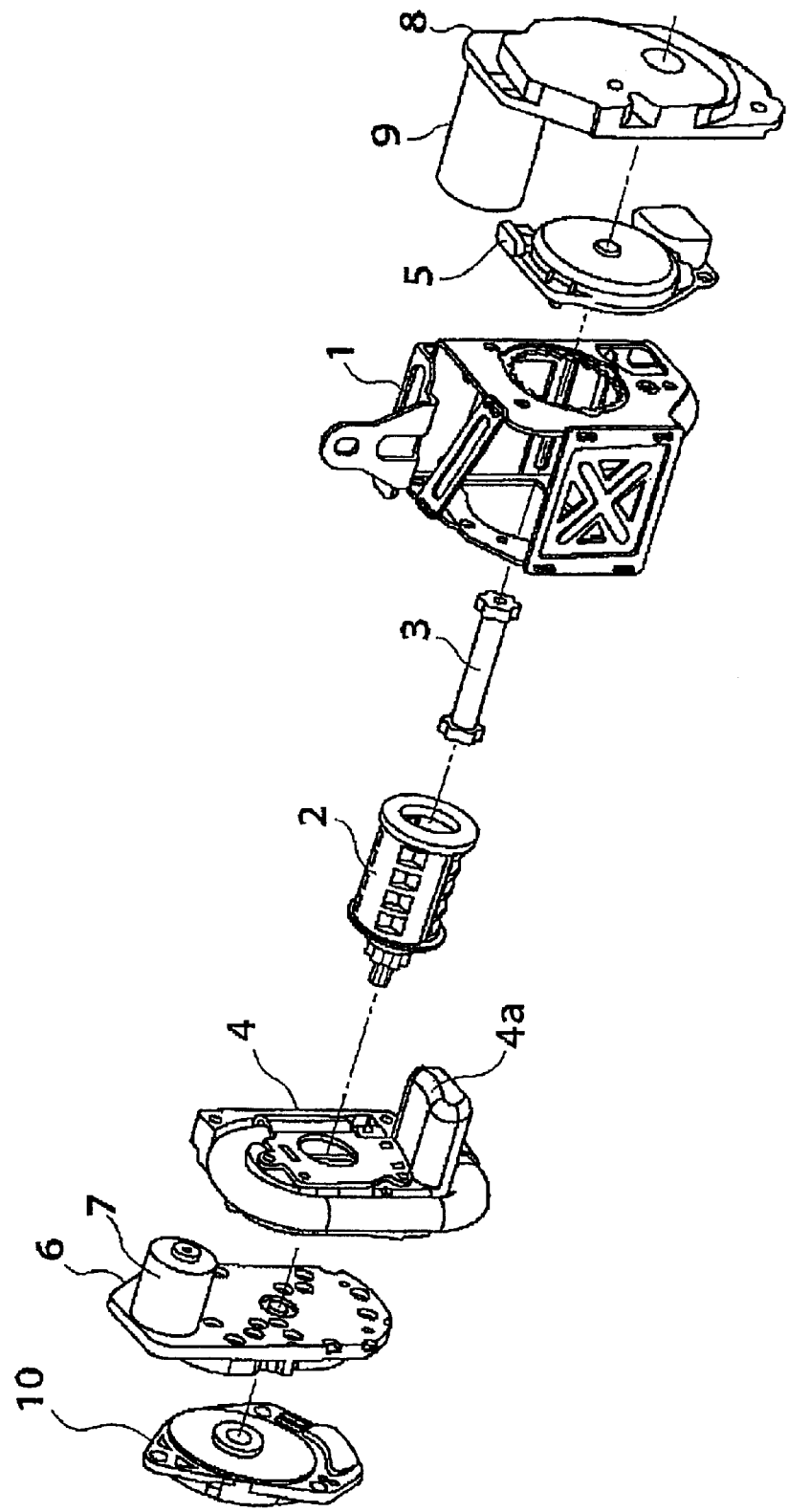
FIG. 1 is an exploded perspective view of the seat belt retractor showing one example of the embodiment of the present invention.
Figure 2:
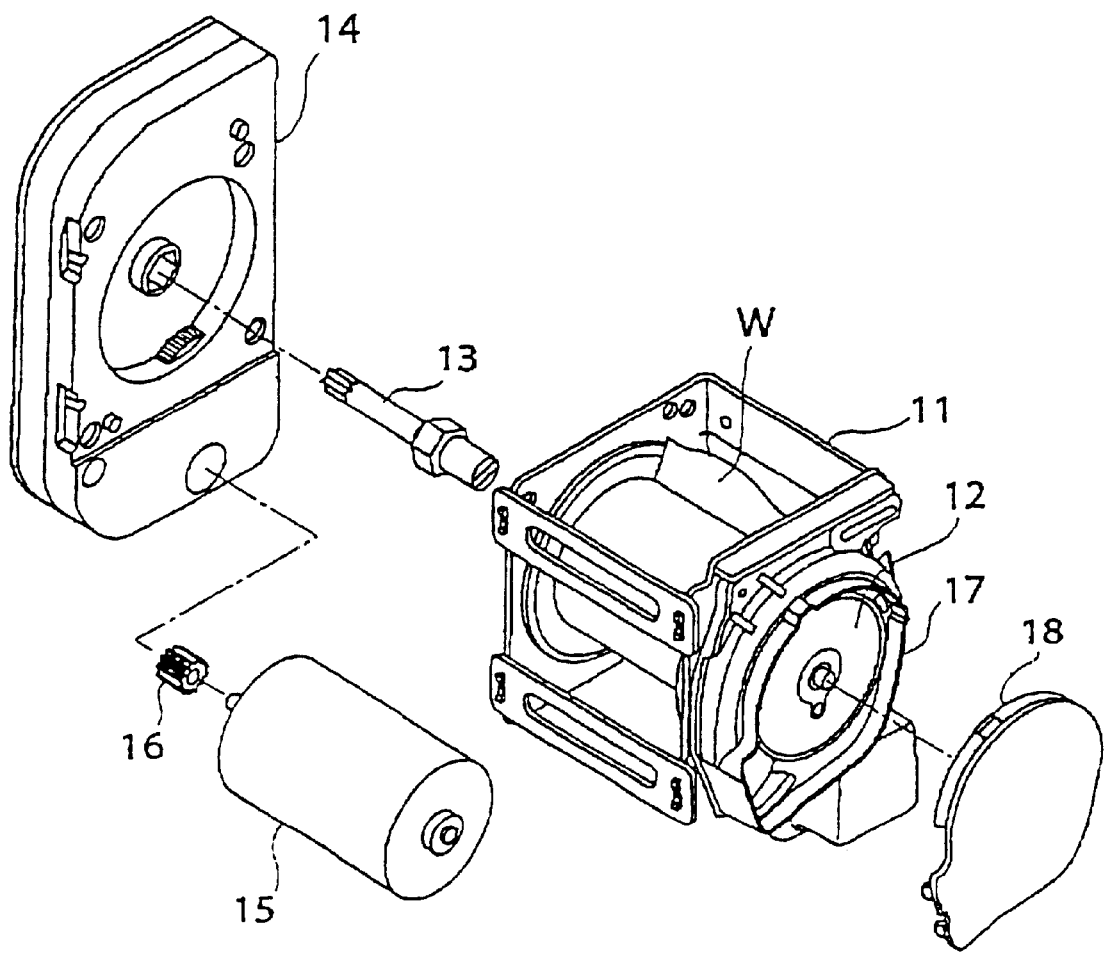
FIG. 2 is an exploded perspective view schematically showing an embodiment of a seat belt retractor of a prior application.

Hereinafter, an embodiment of the present invention will be described with reference to the attached drawing. FIG. 1 is an exploded perspective view of a seat belt retractor showing one example of the embodiment of the present invention. In FIG. 1, numeral 1 designates a base frame, 2 designates a spool, 3 designates a torsion bar, 4 designates a pretensioner, 4a designates a projection of the pretensioner, 5 designates a locking mechanism, 6 designates a first gear-clutch casing, 7 designates a first motor, 8 designates a second gear-clutch casing, 9 designates a second motor, and 10 designates a return spring casing.

In the base frame 1 of the seat belt retractor, the torsion bar 3 is disposed between the spool 2 and a component (not shown) of a locking mechanism. One end of the torsion bar 3 is journalled in a second gear-clutch casing 8 via the component (not shown) of the locking mechanism and the other end of the torsion bar 3 is journalled in the return spring casing 10 via the spool 2. In this embodiment, the pretensioner 4 is provided. The function of the pretensioner 4 is mentioned above. The function of the locking mechanism 5 is also mentioned above in the description of the invention of the prior application.

In this embodiment, the first and second gear-clutch casings 6, 8 are disposed on the right side and the left side of the spool 2 illustrated (front side and the rear side when installed to a vehicle body) via the pretensioner 4 and the locking mechanism 5, respectively, wherein the first and second motors 7, 9 are disposed to the gear-clutch casings 6, 8, respectively.

Reduction gears and a clutch are built in the first gear-clutch casing 6. The rotation of the first motor 7 is transmitted to the torsion bar 3 after the speed is reduced by the reduction gears, and the mechanical engagement between the first motor and the torsion bar 3 is activated by the clutch. Reduction gears and a clutch are also built in the second gear-clutch casing 8. The rotation of the second motor 9 is transmitted to the torsion bar 3 after the speed is reduced by the reduction gears, and the mechanical engagement between the second motor and the torsion bar 3 is activated by the clutch.

Since the clutches may be electromagnetic clutches well known in the art and the reduction gears may be the ones well known in the art, the description thereof will be omitted. However, as the clutches, it is preferable to use a clutch invented by the inventors of this application and filed as Japanese Patent Application No. H11-346273, the disclosure of which is hereby incorporated by reference, because the desired operation can be achieved without using electric signals.

In FIG. 1, a return spring is disposed in the return spring casing 10 and attached from the outside. Therefore, the return spring can be attached to without any change of other parts if necessary. In FIG. 1, the first motor 7 and the second motor 9 are attached to the frame (in this case, the gear-clutch casings correspond to the frame) in such a manner that the seat belt retractor is symmetrical relative to the spool.

When the return spring is not required, the seat belt retractor is configured to be substantially symmetrical as a whole relative to the center of the spool 2, i.e., the center of the seat belt in FIG. 1. It can be avoided that only one side has a large size relative to the center line, thereby relaxing the requirement on the space for installation and enabling the same retractors to be used for a left-side seat and a right-side seat of the vehicle. Since the respective motors 7, 9 are attached to separate frames, the motor 7 can be selectively assembled as one unit including the reduction gears and the clutch as mechanisms attached to the motor 7, where the motor 7 is optional according to the type of the vehicle and the motor 9 is commonly used in any type of the vehicle, thereby improving the workability.

In FIG. 1, the projection 4a of the pretensioner 4 is positioned at a lower part of the base frame 1 while the first and second motors 7, 9 are positioned at an upper part of the base frame 1. By changing the positions of the projection 4a of the pretensioner 4 and the motors 7, 9 relative to the base frame 1, the restriction on the installation by the positions of the projection 4a of the pretensioner 4 and the motors 7, 9 is relaxed, thereby facilitating the design.

Though two motors are used in FIG. 1, three or more motors alternatively may be used. In this case, one may achieve a comforting function, another one may achieve a pretensioning function, and the other one may achieve a function of taking up the seat belt when the engagement between the buckle and the tongue plate is released. In this case, two of the motors may be attached to one of the gear-clutch casings 6, 8.

While particular embodiments according to the invention have been illustrated and described above, it will be clear that the invention can take a variety of forms and embodiments within the scope of the appended claims.

We claim:

1. A seat belt retractor, comprising:
a mechanism for taking up a portion of the seat belt by motor power;
wherein the mechanism comprises two electric motors, each of the motors having a function different from the other motor;
wherein one of the motors is attached to a first frame separate from a second frame to which the other motor is attached, and
wherein one of the two motors is configured to pretension the seat belt by causing the mechanism to rapidly retract the seat belt with such a strong tension as to restrain the occupant to a vehicle seat when the occurrence of a vehicle collision is predicted.

2. A seat belt retractor comprising:
first and second motors, each motor being attached to a separate frame attached to a base frame on opposite ends of a spool, wherein the first motor is configured to pretension the seat belt by causing the mechanism to rapidly retract the seat belt with such a strong tension as to restrain the occupant to a vehicle seat when the occurrence of a vehicle collision is predicted; and
wherein the second motor is configured to retract the seat belt to provide comfort to the occupant.

3. The seat belt retractor of claim 2, wherein the separate frames comprise gear clutch casings.

4. The seat belt retractor of claim 2, wherein the first and second motors are attached to the separate frames so that the motors project toward each other.

5. The seat belt retractor of claim 2, wherein the first and second motors are electric motors.

6. The retractor of claim 2, further comprising a spring configured to apply a force for taking up the seat belt.

7. A seat belt retractor comprising:
a first and second motor, each motor configured to rotate at a respective constant speed and each motor having different functions,
the first motor configured to provide a comforting function by withdrawing the seat belt to a position in which the seat belt tension does not put pressure on the occupant,
the second motor is configured to pretension the seat belt by causing the mechanism to rapidly retract the seat belt with such a strong tension as to restrain the occupant to a vehicle seat when the occurrence of a vehicle collision is predicted.

8. The seat belt retractor of claim 7, wherein the first and second motors are electric motors.

9. The retractor of claim 8, further comprising a spring positioned and configured so that a force generated by the spring urges the retractor to take up the seat belt.

10. A seat belt retractor, comprising:
a mechanism for taking up a portion of the seat belt by motor power,
wherein the mechanism comprises two electric motors, each of the motors having a function different from the other motor,
wherein one of the motors is attached to a first frame separate from a second frame to which the other motor is attached, and
a seat belt pretensioner configured to pretension the seat belt by causing the seat belt to rapidly retract with a strong tension in order to restrain the occupant to a vehicle seat when the occurrence of a vehicle collision is predicted.

11. The retractor of claim 10, further comprising a spring configured to apply a force for taking up the seat belt.

* * * * *